United States Patent
Koning et al.

(10) Patent No.: US 8,399,553 B2
(45) Date of Patent: Mar. 19, 2013

(54) CARBON NANOTUBE REINFORCED POLYMER

(75) Inventors: Cornelis Koning, Eindhoven (NL); Nadia Grossiord, Eindhoven (NL); Jan Meuldijk, Eindhoven (NL); Joachim Loos, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 567 days.

(21) Appl. No.: 12/438,208

(22) PCT Filed: Apr. 6, 2007

(86) PCT No.: PCT/EP2007/003144
§ 371 (c)(1),
(2), (4) Date: Nov. 6, 2009

(87) PCT Pub. No.: WO2007/121847
PCT Pub. Date: Nov. 1, 2007

(65) Prior Publication Data
US 2010/0069559 A1    Mar. 18, 2010

(30) Foreign Application Priority Data

Apr. 21, 2006  (EP) .................................. 06008273
Oct. 27, 2006  (WO) ................. PCT/EP2006/010362

(51) Int. Cl.
*C09B 67/00* (2006.01)
(52) U.S. Cl. ........ 524/496; 524/502; 977/742; 977/750; 977/753
(58) Field of Classification Search ................. 524/496, 524/502; 977/742, 750, 753
See application file for complete search history.

(56) References Cited

U.S. PATENT DOCUMENTS 7,569,637 B2 *   8/2009   Koning et al. ................ 524/502

FOREIGN PATENT DOCUMENTS

| WO | 02/076888 | 10/2002 |
|----|-----------|---------|
| WO | WO 2004/072159 | 8/2004 |
| WO | WO 2004072159 A1 * | 8/2004 |
| WO | 2007/121847 | 11/2007 |

OTHER PUBLICATIONS

Written Opinion of the International Searching Authority for PCT/EP2007/003144, mailed Sep. 5, 2007.

* cited by examiner

*Primary Examiner* — Michael M Bernshteyn
(74) *Attorney, Agent, or Firm* — Nixon & Vanderhye P.C.

(57) ABSTRACT

The present invention relates to a (process for preparation of a) carbon nanotubes reinforced polymer, wherein the matrix polymer has both a low molecular weight fraction as well as a high molecular weight fraction, as a result of which the level of conductivity of the resulting composite can be controlled.

7 Claims, 3 Drawing Sheets

CARBON NANOTUBE REINFORCED POLYMER

This application is the U.S. national phase of International Application No. PCT/EP2007/003144, filed 6 Apr. 2007, which designated the U.S. and claims priority to Europe Application No. 06008273.2, filed 21 Apr. 2006, and PCT/EP2006/0010362, filed 27 Oct. 2006, the entire contents of each of which are hereby incorporated by reference.

FIELD

The present invention relates to a process for the preparation of a carbon nanotube reinforced polymer by:
a) contacting carbon nanotubes in an aqueous medium with a water-soluble component, being either an at least partial water-soluble first polymer or a water-soluble surfactant;
b) mixing the resulting product from step a) with an aqueous latex of a second polymer;
c) removing water from the so obtained mixture;
d) heating the product from step c) to a temperature at which the second polymer flows; and
e) solidifying the product of step d) into a desired form.

BACKGROUND AND SUMMARY

Such a process is described in WO-A-2004/072159.

In recent years, much effort has been put into the incorporation of carbon nanotubes in polymer matrices. The composites obtained are interesting materials, since they have enhanced electrical and mechanical properties at very low loading due to the specific nanotube characteristics, such as their high aspect ratio and electrical conductance. However, dispersion of carbon nanotubes in highly viscous polymers is difficult and has often been attempted by functionalizing the nanotubes, leading to attractive interactions between the nanotubes and the polymer. In addition, dispersing exfoliated nanotubes has been found to be a challenge, since nanotubes are highly bundled as a result of strong van-der-Waals interactions.

DETAILED DESCRIPTION

Figure 1:
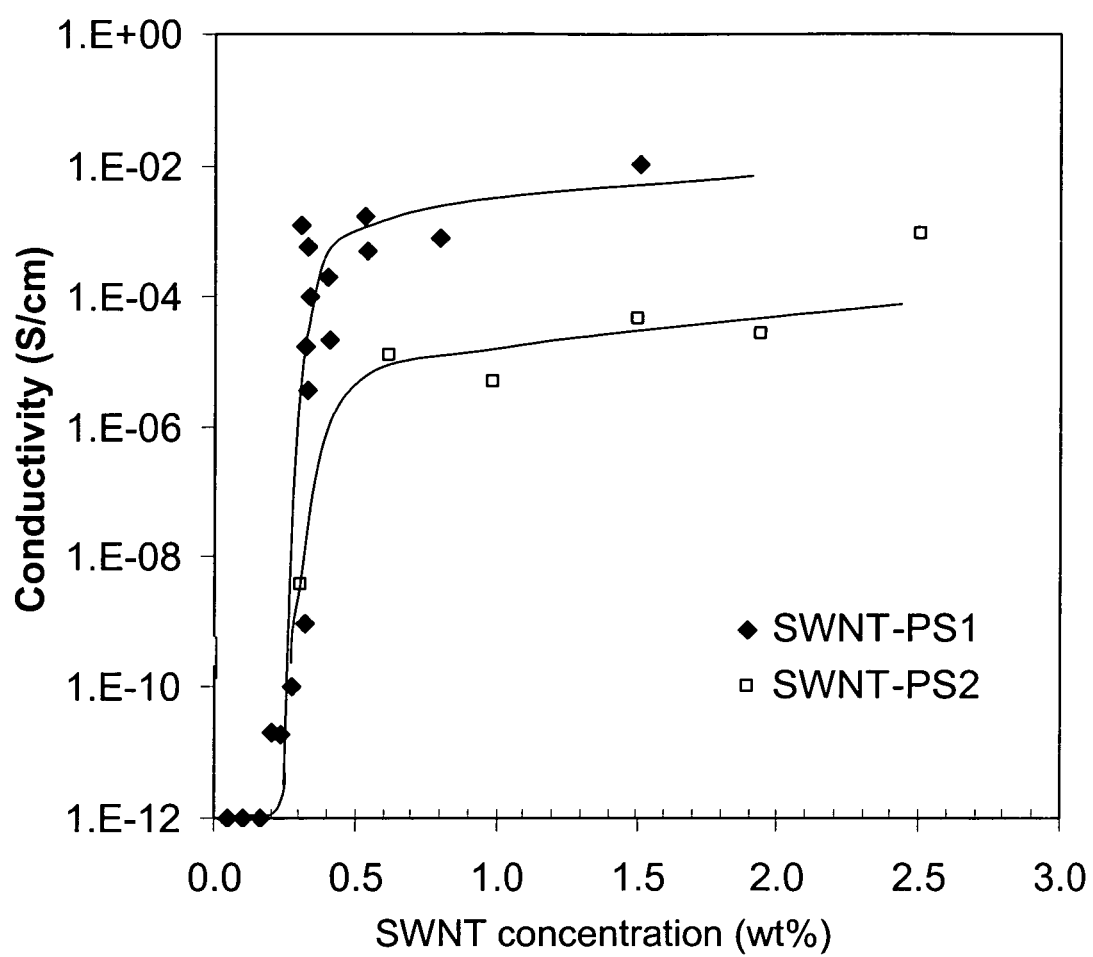
FIG. 1 is a graph showing conductivity measurements for PS1 and PS2 nanocomposites as described below.

In general, materials can be divided into three groups regarding their electrical conductivity $\delta$: insulators ($\delta < 10^{-7}$ S/m), semi-conductors ($\delta = 10^{-7}$-$10^5$ S/m) and conductors ($\delta > 10^5$ S/m). For intrinsically non-conductive polymers, typical conductivity values range from $10^{-15}$ S/m up to $10^{-12}$ S/m. Carbon fillers can have conductivities in the range of $10^4$ S/m up to $10^7$ S/m. In composites, the conductivity levels off to a slightly lower value than for the pure carbon species at higher filler concentration.

Carbon nanotube reinforced polymers are presently made by incorporating carbon nanotubes (CNTs), generally produced in the form of a bundle, in a polymer matrix. In order to obtain a homogeneous distribution of these CNTs, they are pre-treated by either an ultrasonic treatment, or by a chemical modification process, aimed at improving the dispersability of the individual CNT in the polymer matrix. The incorporation of CNTs in such a polymeric matrix is beneficial for the enhancement of the stiffness as well as the conductivity of the polymer matrix material It has been found that using the teachings of the cited art results in a steep change of the conductivity when increasing the amount of carbon nanotubes. As the transition is almost an S-curve, control of the level of conductivity between the original conductivity of the matrix, and the final level of the reinforced product is difficult.

There is a need to be able to set the value of the electrical conductivity at a certain desired level (levels like indicated above for the different conductive materials).

It has surprisingly been found, and that is the heart of the present invention, that with a certain amount of a low molecular weight fraction in the second polymer one is able to control the level of electrical conductivity of the composite, at a giving loading of the carbon nanotubes.

The process of the present invention has as its characteristic, that the second polymer has both a low molar mass fraction and a high molar mass fraction, the low molar mass fraction having a weight averaged molecular weight (Mw) of between 500 and 20,000 g/mol, the high molar mass fraction having an Mw of between 20,000 and 5,000,000 g/mol, and the low molar mass fraction is present in the second polymer in an amount greater than 5 wt %.

The steps of the process of the present invention will be separately discussed below.

Step a): Preparing a Slurry from Carbon Nanotubes in an Aqueous Medium.

This method is described in WO-A-02/076888. In this publication a method is described for the exfoliation of single wall carbon nanotubes (SWNT), resulting in a stable aqueous product containing essentially single tubes. In this publication a water-soluble polymeric material is used for obtaining the exfoliated nanotubes. The contents of this publication are incorporated herein by reference. This process can also be applied when using multiwall CNTs (MWNT). In the process of the present invention the use of SWNTs is preferred.

As described in WO-A-02/076888, the at least partial water-soluble polymeric material should preferably be of a hydrophilic nature, either from natural or synthetic origin. Reference is also given to WO-A-2004/072159. It has shown to be advantageous to improve the incorporation of the at least partial water-soluble polymeric material, when its hydrophilic nature is to be improved, to add (e.g. in this step a)) an electrolyte, like a water-soluble salt, like sodium chloride. This improves the dispersability of the CNT in the matrix of the carbon nanotubes reinforced polymer.

In step a) also a water-soluble surfactant can be used to effectively exfoliate the CNTs. Preference is given to a salt of a hydrocarbon sulphate or sulphonate, like sodiumdodecyl sulphate (SDS) or sodiumdodecyl sulphonate. Also preferred is a polyalkyleneoxide based surfactant.

The process of the present step a) is performed by contacting the essential ingredients (the polymer or surfactant, and the carbon nanotubes) in any order in water or an aqueous solution. The resulting product can obtain up to 75 weight % of carbon nanotubes, coated with the said first polymer or surfactant. In this process, step a) the mass ratio of the first polymer or surfactant to the carbon nanotubes can range from 0.05 to 20.

The temperature at which this step a) is performed is not critical. Temperatures between room temperature and 75° C. are very well suited.

The residence time needed for an effective exfoliation of the carbon nanotubes can be easily determined by a man skilled in the art. Residence times below 1 hour have proven to be sufficient for that purpose, depending on the total input of the mixing energy (like ultrasonic energy).

Step b): The Product Resulting from Step a) is Brought into Contact with an Aqueous Latex of a Second Polymer.

This second polymer is the polymer which constitutes the matrix of the carbon nanotubes reinforced polymer, in which the carbon nanotubes are well-dispersed. Every aqueous polymer latex known to the skilled man can be used. Preference is given to a second polymer being selected from the group comprising polyacrylates, styrene-based (co-)polymers, butadiene-based (co-)polymers, polycarbonate, acrylonitrile-based (co-)polymers, (halogen-containing) polyolefins (like polyethylene or polypropylene, homo- as well as copolymers), and polyamides. Even more preferred is the use of polystyrene, or a copolymer of an olefin or of styrene with either a (meth-)acrylate, maleic anhydride, a maleimide, a 2- or 4-vinylpyridine, acrylonitrile, or another vinyl or vinylidene type monomer as the second polymer.

In order to achieve the benefits of the present invention, the second polymer has to have both a low molar mass fraction and a high molar mass fraction, the lower molar mass fraction having a weight averaged molecular weight (Mw) of between 500 and 20,000 g/mol, the higher molar mass fraction having an Mw of between 20,000 and 5,000,000 g/mol. The amount of the low molar mass fraction in the second polymer is larger than 5 wt. %. More preferred, this amount is at least 6.5 wt. %. The low molar mass fraction is also generally present in an equal or even minor amount; more preferred this is at most 40 wt. % of the second polymer.

The low molar mass fraction can be based on the same monomer(s) as the high molar mass fraction, but the monomers for the fractions may also differ from each other. Preferably, the second polymer is a composition of two miscible polymers, either based on different monomers or based on the same monomers, one polymer forming the low molar mass fraction, the other one forming the high molar mass fraction.

The composition of the second polymer can be obtained by diverse processes, both during the polymerization to the second polymer, or by an admixture to the product of a polymerization. In a first preference, the second polymer is obtained by applying polymerization conditions, resulting in a broad molar mass distribution, comprising both a low Mw-polymer (with Mw between 500 and 20,000 g/mol) and a higher Mw-polymer (with Mw between 20,000 and 5,000,000 g/mol. In a second preference, the second polymer is obtained by mixing a low Mw-polymer with a high Mw-polymer. The conditions under which the polymerization to the second polymer has to take place are depending on the type of the second polymer to be used. In itself, having selected the type of the second polymer, the skilled man is aware how to produce in a polymerization process the low molar mass fraction and the high molar mass fraction, either during one polymerization, or in two separate polymerizations. In the last version, the products of the two separate polymerizations are mixed together in the desired ratio.

The temperature of this mixing step b) generally lies between 10 and 150° C. The pressure is generally atmospheric, but may be increased in order to accommodate for processability in this step b) or in the following step c). The residence time for this step B) is not critical, and generally does not exceed 1 hour.

Step c): Treating the Mixture Obtained in Process Step b), to Remove (Substantially All of the) Water.

There are different physical methods available to the skilled man to achieve this removal. Out of these methods, a preference is for performing step c) by means of evaporation, freeze-drying, or flash-drying.

Step d): Preparation of a Homogeneous Dispersion of the CNTs in the Second Polymer.

In the case that the second polymer is a thermoplastic polymer, the temperature in this step d) is chosen such that it is 10-100° C. above the melting point (in case of a (semi-)crystalline second polymer), or above the glass transition point (in case of an amorphous second polymer). In all cases, the man skilled in the art is aware of the process conditions under which this step d) is to be performed, depending on the nature of the selected second polymer.

Step e): The Solidification of the Product of Step d) in a Desired Form.

This step e) can be a molding step, a pelletizing step, an extrusion, an injection or compression molding step, or any known step to form a solidified polymer object.

The process of the present invention results in a CNT reinforced polymer. The CNTs are essentially individually dispersed in the polymer matrix. The polymer therefore has improved stiffness as well as better conductivity properties.

The invention also relates to a carbon nanotube reinforced polymer, obtainable by the process of the present invention. With the (process of the) present invention polymer composites are obtainable having a conductivity percolation threshold at or below 3 wt. % of CNT. In particular, the process of the present invention results in a product that has a resistivity of less than 100 Ω·cm at a carbon nanotubes content of less than 3 wt. %. In the art such a resistivity is only achieved at much higher loadings of the CNT, as can be seen from the article in J. Mater. Sci. 37, 2002, pages 3915-23.

In the present invention it has been found that generally the amount of the low mass fraction in the second polymer will not comprise more that the half (in weight) of the second polymer. Preferably, the weight ratio between the low molar mass part of the second polymer and the high molar mass part of the second polymer is between 0.065 and 0.67. More preferred, the ratio is between 0.10 and 0.25. As indicated above, the two fractions can be based on the same monomers; they can also be based on different monomers, as long as the two fractions are compatible and/or miscible with each other. Depending on the desired plateau-level of the conductivity, the required percentage of low molar mass fraction can be easily determined.

The reinforced polymer of the present invention can be used for several applications in which the improved stiffness and conductivity properties can be exploited. Reference can be given to shielding applications (like electromagnetic interference shielding); high modulus conducting body panels for the automotive industry with a better surface appearance than glass fiber filled polymers; nano-electric devices (such as thin-film transistors), and others.

The invention is illustrated by the following non-limiting Examples.

Materials and Techniques

Materials: CNT HIPCO NT (Carbon Nano Technology) (a SWNT), and SDS (Merck) were used as received.

An aqueous product of CNT+SDS was prepared according to the teachings of WO 02/076888. SDS was dissolved in water at room temperature to form solutions of 0.5 wt. % to 15 wt. %. A powder of as-produced single wall nanotubes which contains a bundled network of ropes, was sonicated at very mild conditions (50 W, 43 KHz) for 15-20 minutes in the solutions (of concentrations between 0.2 wt.% to 3 wt. %). A black, homogeneous ink-like product was obtained, and mixed at room temperature with different polystyrene (PS) or polypropylene (PP) latices. The resulting mixture was then freeze dried (Christ alpha 2-4) overnight and the dry powder was compression molded. For the nanocomposites based on the PS1, PS2 and PS3 latices, the molding was performed at 160° C. for 4 minutes at 10 MPa (after 4 cycles of degassing). For the nanocomposites based on the polymer latices PS4 and PS5: after 4 cycles of degassing, the dry powder was compression molded at 180° C. for 2 times 20 s at 4 MPa and once at 10 MPa for 2 minutes. For the nanocomposites based on the PP1 and PP2 latices, the molding was performed at 180° C. for 3 minutes at 10 MPa.

Making of PS1-PS2 Latices

PS1 is a latex having a broad molecular weight distribution, whereas PS2 has a narrow molecular weight distribution.

Preparation of Polymer Latex PS1

The emulsion polymerization was carried out in an oxygen free atmosphere. 292 g of styrene were mixed with 728 g of water, 13 g of SDS, and 1.1 g of NaHCO$_3$ as a buffer. The temperature was kept at 50° C. The reaction was initiated by 1 g of SPS (sodium per sulphate); the reaction time was 2.5 hours.

The reaction mixture was not degassed before the polymerization was initiated, which means that there was still some dissolved oxygen in the reaction mixture, which has lead to the formation of a significant amount of low molecular weight PS species.

Preparation of Polymer Latex PS2

A similar procedure as with latex PS1 was applied, but with the following conditions: 200 g of styrene; 695 g of water; 13.4 g of SDS; 1 g of SPS.

The temperature of the reaction was kept at 65° C., and the reaction mixture was carefully degassed with Argon prior to the initiation of the polymerization (as a result, a PS with essentially high molecular weight chains was synthesized).

Preparation of PS3 (Blend of the PS2-Latex with a Low Mw Polystyrene)

Incorporation of a low molar mass PS into the PS2 latex was achieved by the following procedure: 130 g of PS2 latex was directly mixed with 624 mg of SDS, followed by the incorporation of 715 mg of PS standard (Mw=550 g/mol). The resulting dispersion was subjected to high shear forces for 3 minutes by using an Ultraturrax T50 (Ika, Labotechnic, Janke and Kunkel) at minimum speed (4000 rpm).

Preparation of Polymer Latex PS4

The emulsion polymerization was carried out in an oxygen free atmosphere (including prior degassing for 2.5 hours with Ar). First, 252.2 g of styrene were mixed with 715 g of water, 26 g of SDS and 0.5 g of Na$_2$CO$_3$. The temperature was kept at 50° C., and the reaction initiated by injection of 0.7 g of SPS dissolved in 7 mL of water. The reaction time was 2.5 hours. The resulting latex had a bread molecular weight distribution.

Preparation of Polymer Latex PS5

The experimental procedure for the synthesis of PS5 was similar to the one used to synthesize PS4. The degassing lasted 5 hours. 252.04 g of styrene were mixed with 715 g of water, 25.97 g of SDS and 0.45 g of Na$_2$CO$_3$. The temperature was kept at 70° C.; the reaction time was 0.5 hours. The resulting latex had a narrow molecular weight distribution.

Making of Polystyrene Nanocomposites

Materials: CNT—HiPCO NTs purchased from Carbon Nanotechnology (SWNT), and SDS (Merck) were used as received. The preparation of the aqueous product of the CNT+SDS was as described above.

Making of Polypropylene Nanocomposites

Both multiwall (MWNT) as well as single wall nanotubes (SWNT) were used for the preparation of these nanocomposites. The MWNT's were obtained from Nanocyl (Nanocyl-3100); the SWNT's were HIPCO NT's, from Carbon Nanotechnology. The polypropylenes used were Priex® 801, a maleic anhydride-grafted homopolypropylene and Priex® 701, a maleic anhydride grafted copolymeric polypropylene witch ca. 5 wt. % of ethylene as comonomer from Solvay, both with an amount of PP having an M$_w$ below 20,000 g/mol (by GPC) of 29 wt. %.

Figure 2:
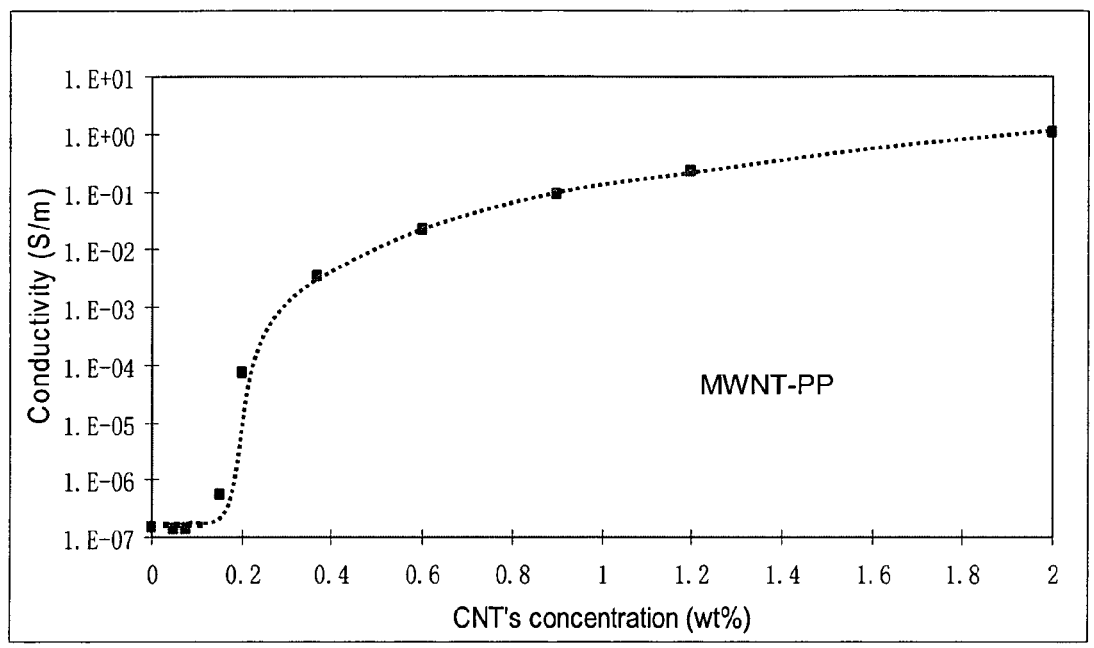
FIGS. 2 and 3 are graphs respectively showing conductivity measurements for MWNT-PP and SWNT-PP nanocomposites as described below.
Figure 3:
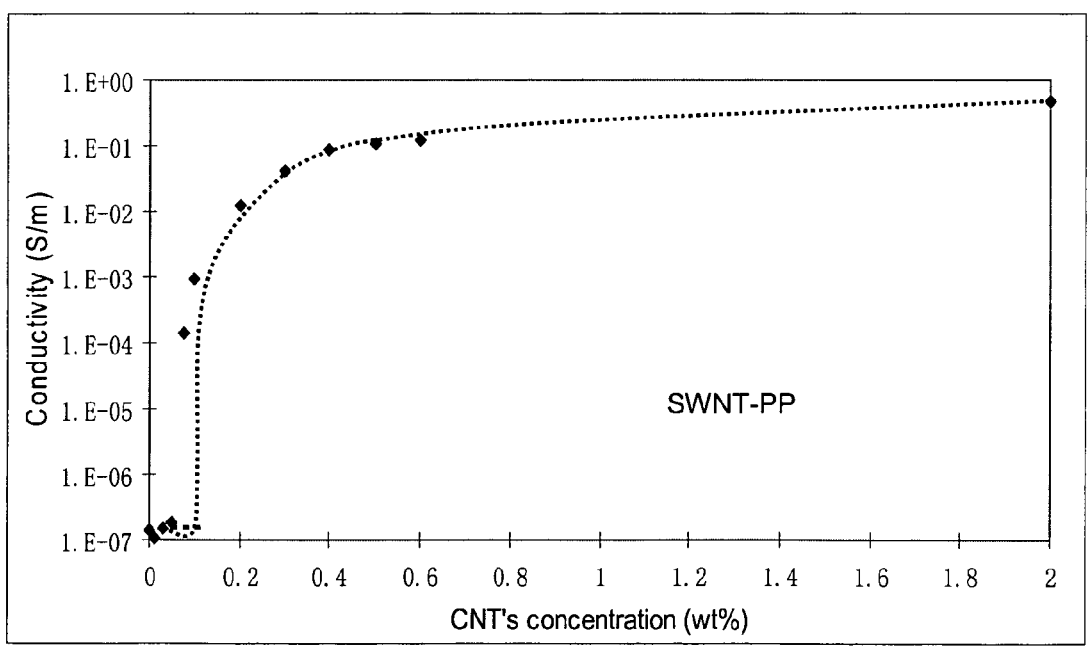
Figure 4:
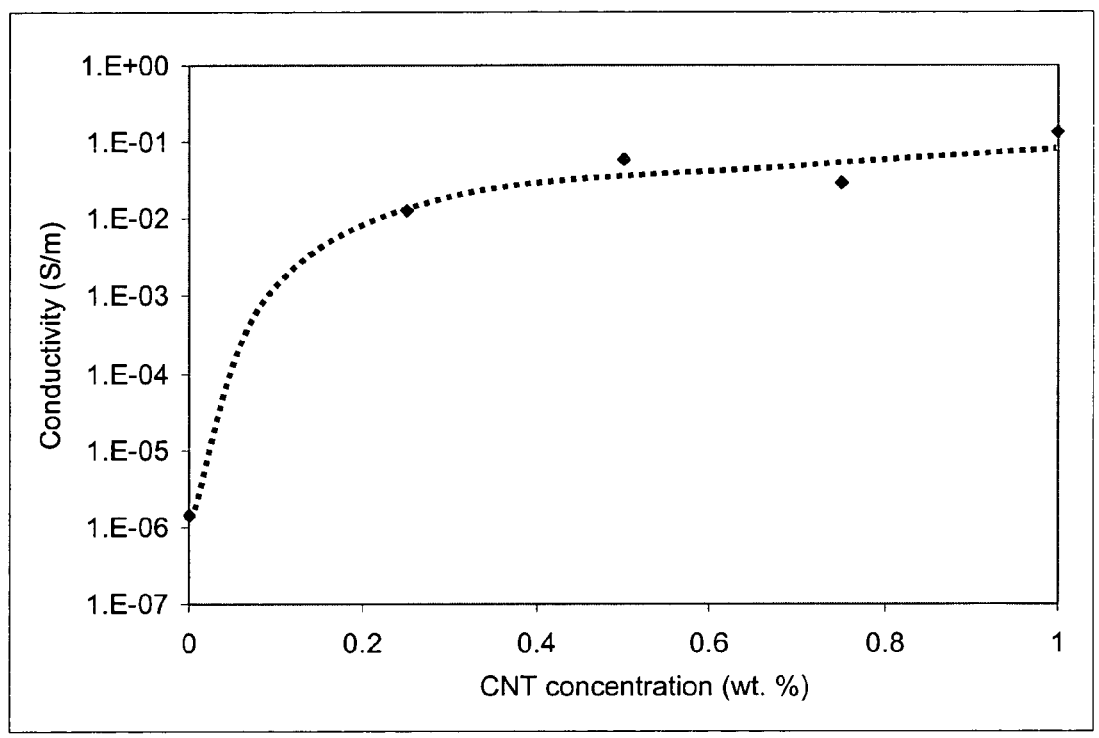
FIG. 4 is a graph showing conductivity measurements for HIPCO-SWNT nanocomposite as described below.

The conductivity measurements were 2-point measurements. The results for Priex® 801 are given in FIG. 2 for the MWNT composite, and in FIG. 3 for the SWNT composite; FIG. 4 gives the results for Priex® 701 with HIPCO-SWNT's.

Conductivity Measurements

Room temperature electrical conductivity measurements were carried out using either a 2 or a 4 points configuration DC-Conductivity Keithley 6512 Programmable Electrometer.

Measurements were performed directly on the surface of the films. The contact between the sample and the measuring device was improved by the use of a colloidal graphite paste (Cat#12660) provided by Electron Microscopy Science.

The results of the conductivity measurements are given in FIG. 1 (for PS1 and PS2 nanocomposites), in Table I (for PS2 and PS3 nanocomposites); and in Table II (for PS4 and PS5 nanocomposites).

PS1-PS2 curve of the conductivity measurements: 4-point measurements were used. PS2-PS3 comparison of the values of the conductivity: 2-point measurements were used. For the PS4 and PS5 measurements: 4-points measurements were used.

TABLE I

| Nanocomposite | Conductivity (S/m) |
|---|---|
| PS2 + 2 wt % CNT | $6 * 10^{-3}$ |
| PS3 + 2 wt % CNT | $6 * 10^{-2}$ |

TABLE II

| Polymer matrix | NT concentration (wt %) | Conductivity (S/m) |
|---|---|---|
| PS4 | 2 | $2.5*10^1$ |
| PS4 | 1.75 | $1.5*10^1$ |
| PS5 | 1.75 | $5.3*10^0$ |
| PS5 | 2 | $5.5*10^0$ |

Measurement of the Amount of Low Molecular Weight PS in the Latices

The determination of the amount of polymer which has a molecular weight below 20,000 g/mol, corresponding to an elution time in the GPC-analysis, with THF as solvent, of about 12.5 min, was carried out with Waters/GPC equipment.

The amounts of PS or PP having a Mw below 20,000 g/mol, listed in Table III have been calculated by taking into account the amount of PS species with a molecular weight comprised between 20,000 g/mol and the Mw of the standard of the GPC, i.e. 550 g/mol.

TABLE III

| PS type | Amount of polymer below 20,000 g/mol (wt %) | Mw-range of higher molar fractions (g/mol) |
|---|---|---|
| PS1 | 24 | $2.0*10^4$-$2.0*10^6$ |
| PS2 | 5 | $2.0*10^4$-$1.5*10^6$ |
| PS3 | 7.5 | $2.0*10^4$-$1.5*10^6$ |

TABLE III-continued

| PS type | Amount of polymer below 20,000 g/mol (wt %) | Mw-range of higher molar fractions (g/mol) |
|---|---|---|
| PS4 | 20 | $2.0*10^4$-$1.3*10^6$ |
| PS5 | 5 | $2.0*10^4$-$1.8*10^6$ |
| PP | 29 | $2.0*10^4$-$8.0*10^5$ |

The invention claimed is:

1. A process for the preparation of a carbon nanotube-reinforced polymer comprising the steps of:
   a) contacting carbon nanotubes in an aqueous medium with a water-soluble component, wherein the water-soluble component is either a water-soluble first polymer or a water-soluble surfactant;
   b) mixing the resulting product from step a) with an aqueous latex of a second polymer;
   c) removing water from the mixture obtained from step b);
   d) heating the product from step c) to a temperature at which the second polymer flows; and
   e) solidifying the product of step d) into a desired form; wherein
   the second polymer has both a low molar mass fraction and a high molar mass fraction, the low molar mass fraction having a weight average molecular weight (Mw) of between 500 and 20,000 g/mol, the high molar mass fraction having a Mw of between 20,000 and 5,000,000 g/mol, and wherein the low mass fraction is present in the second polymer in an amount greater than 5 wt. % up to at most 40 wt. %.

2. The process according to claim 1, wherein the second polymer is a composition comprised of first and second miscible polymers, wherein the first miscible polymer is the low molar mass fraction, and the second miscible polymer is the high molar mass fraction.

3. The process according to claim 1, wherein the second polymer is obtained by mixing a low Mw-polymer with a high Mw-polymer.

4. The process according to claim 1, wherein the second polymer is obtained by applying polymerization conditions, resulting in a broad molar mass distribution, comprising both a low Mw-polymer having a Mw between 500 and 20,000 g/mol and a high Mw-polymer having a Mw between 20,000 and 5,000,000 g/mol.

5. The process according to claim 1, wherein the second polymer is a copolymer of styrene with at least one selected from the group consisting of a (meth-)acrylate monomer, a maleic anhydride monomer, a maleimide monomer, a 2-vinylpyridine monomer, a 4-vinylpyridine monomer, and an acrylonitrile monomer.

6. The process according to claim 1, wherein the low molar mass fraction is present in the second polymer in an amount of at least 6.5 wt. %.

7. The process according to claim 1, wherein single wall carbon nanotubes are used.

\* \* \* \* \*